May 15, 1962 K. MEYER ET AL 3,034,884
REDUCTION ROASTING OF IRON ORES
Filed Feb. 26, 1959 3 Sheets-Sheet 1

Inventors:
KURT MEYER
HANS RAUSCH
WALTER KOCK
By Bailey, Stephens & Huettig
ATTORNEYS

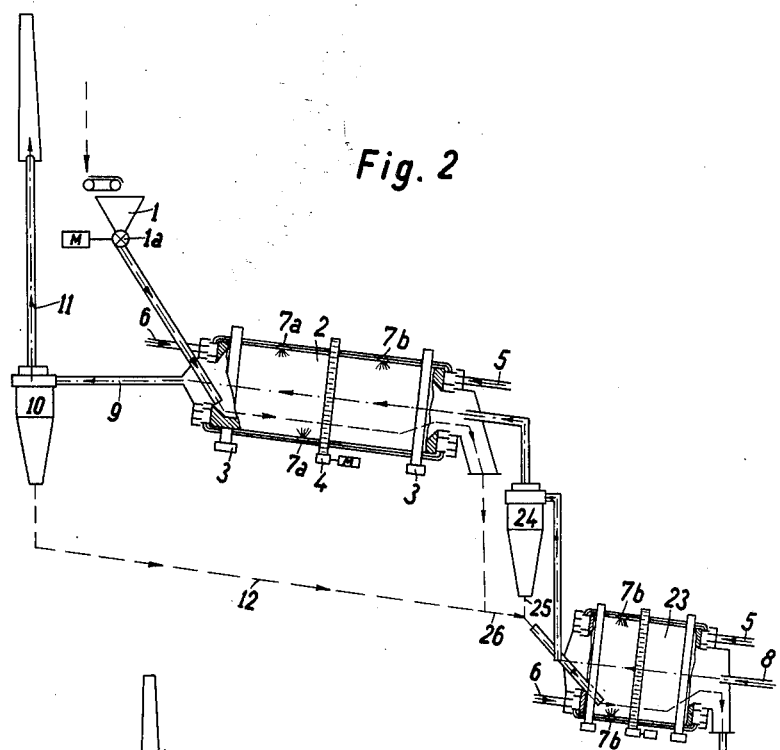
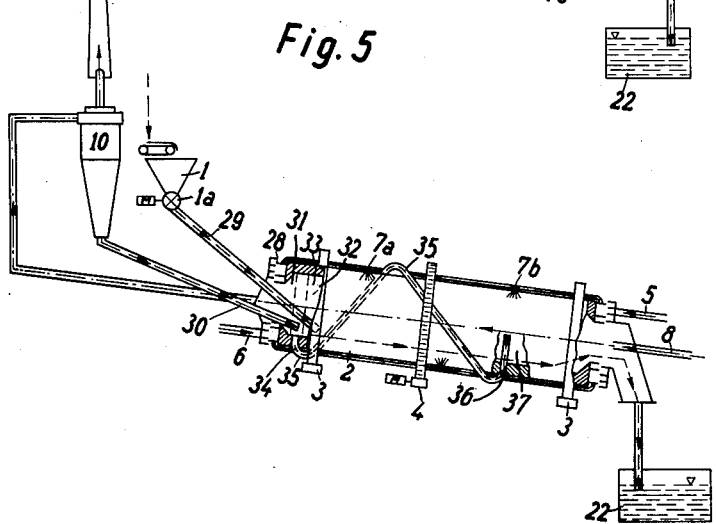

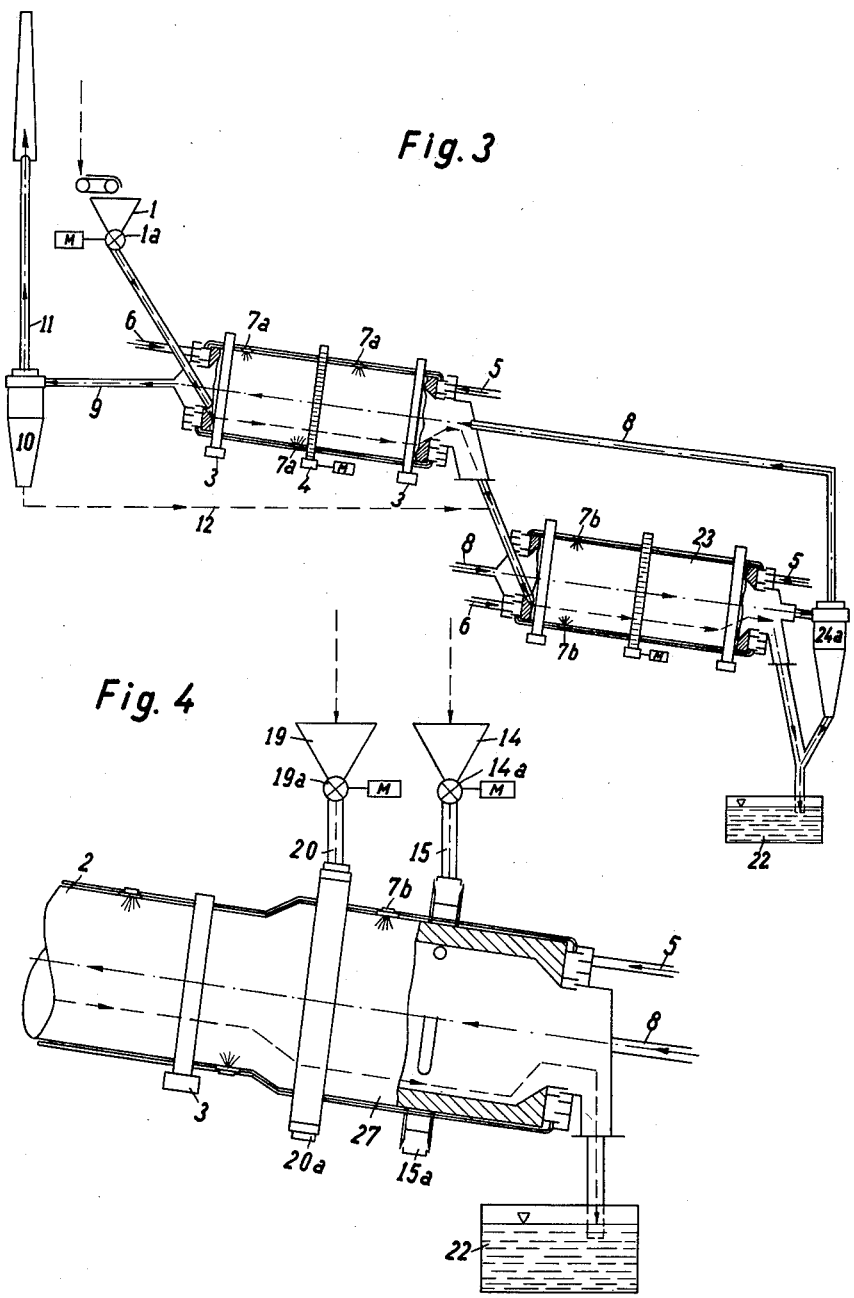

United States Patent Office 3,034,884
Patented May 15, 1962

3,034,884
REDUCTION ROASTING OF IRON ORES
Kurt Meyer, Frankfurt am Main, Hans Rausch, Oberursel (Taunus), and Walter Koch, Offenbach (Main), Germany, assignors to Metallgesellschaft Aktiengesellschaft, Frankfurt am Main, Germany
Filed Feb. 26, 1959, Ser. No. 797,005
Claims priority, application Germany Mar. 14, 1958
12 Claims. (Cl. 75—1)

This invention relates to the roasting of iron ores and in particular to the roasting of such ores under reducing conditions.

The reduction roasting of iron ores in the presence of reducing gases is well known wherein the iron ore is reduced to a low oxygen content, such as FeO and $Fe_3O_4$. In a particular process heretofore undisclosed, a so-called magnetizing roasting is employed wherein the raw ore first undergoes a magnetic separation to remove the magnetite and then the residual hematite is roasted to convert it as much as possible to magnetite. This reduction roasting is performed primarily in rotary furnaces which have a burner adjacent the outlet or discharge end of the furnace. The modern forms of these furnaces have burners longitudinally distributed throughout the furnace with the omission of the burner adjacent the outlet end. This arrangement of the burners allows a control within wide limits of the temperatures and gas consumption in the furnace and permits the adjustment of the burners for obtaining the best results for the particular operating conditions being employed.

A portion of the reducing gas is usually introduced cold adjacent the outlet end of the furnace. This gas contacts the material being roasted between the last burner and the outlet end of the furnace. This is the so-called cooling zone in which a part of the heat emitted by the roasted material is taken up by the gas and carried further into the furnace.

In spite of this, the major portion of the heat remains in the material after it is discharged from the furnace, and this heat must be dissipated in order to cool the material. For cooling, the material is wetted with water or else very complicated and expensive cooling means must be coupled to the furnace.

It is also known to reduction roast volatile metals, such as metallic smoke dust, from ores and other products obtained from smelting by passing such dust or products first either partially or completely through the reduction zone of a furnace, together with other means for reducing the products if necessary.

The present invention employs the idea of the reduction of metal smoke dust or similar products in the reduction roasting of iron ores in order to make use of the otherwise wasted heat in the material discharged from the furnace for increasing the quantity of reduced ore product.

In the hitherto known process, a portion of the ore charged into the furnace is carried away in the form of dust by the gases escaping from the furnaces. The quantity of dust carried away is approximately from 5 to 30% of the ore charged into the furnace, all depending upon the fineness of the ore entering the furnace and the amount of disintegration and dusting of the material while being roasted in the furnace. This carried away dust is either not or very incompletely reduced because the dust never reaches a zone in the furnace having a temperature high enough to cause a complete reduction. Furthermore, the inlet or charging end of the furnace is usually exposed to oxidizing conditions in order to use heat of the reduction gases as completely as possible. The treatment of the exhaust gases and dust presents a very serious problem to the industry.

The object of this invention is to produce a process and apparatus for solving the problem of handling the exhaust gases and dust.

In general, the invention comprises the introduction of a part of the iron ore into the furnace adjacent the final cooling zone at the outlet end of the furnace rather than into the inlet end of the furnace. According to our invention the material introduced into this final zone is very fine, with a particle size preferably below 1 mm. The means by which the objects of the invention are obtained are disclosed more fully with reference to the accompanying drawings, in which:

FIGURE 2 is a similar view of a modified construction of this furnace.

FIG. 3 is a similar view of another modified construction of the furnace according to the invention which, contrary to that illustrated in FIG. 2, operates partly in concurrent flow, and FIGURE 4 shows the outlet end of a furnace with dust admission and widened cross-section.

FIGURE 5 is a diagrammatic vertical cross-section of another modified construction of this furnace.

Figure 1:
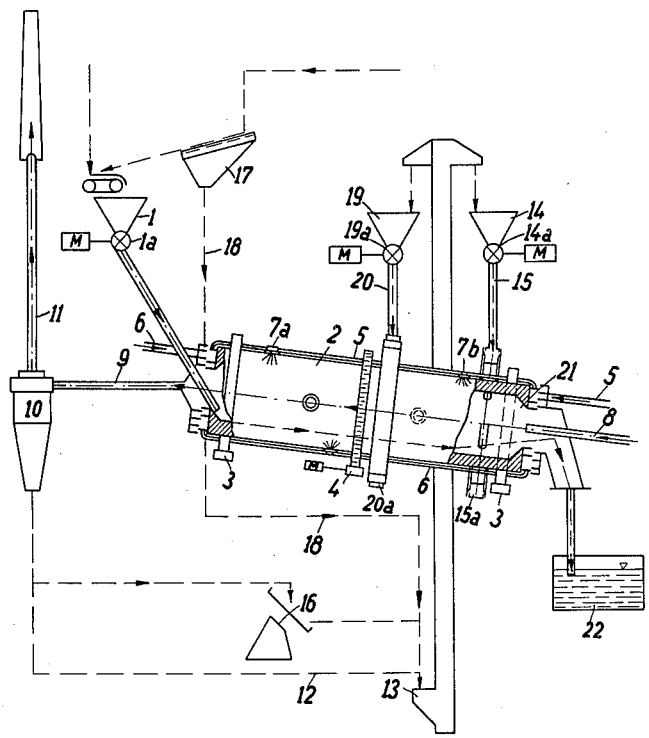
FIGURE 1 is a diagrammatic vertical cross-section of a rotary furnace according to the invention.

In FIG. 1 the rotary furnace 2 runs on guide rollers 3 and is driven by the toothed rim 4. The raw ore is charged into the furnace by a charging device 1 through the rotary gate valve 1a. Burner gas and combustion air are fed to the burners 7a and 7b through the conduits 5 and 6. The burners 7a nearer the inlet end of the furnace are operated to provide an oxidizing atmosphere and the burners 7b nearer the outlet end to effect reduction. In addition reducing gas is introduced at the outlet end by the conduit 8.

The dust is removed from the dust-laden waste gas passing through the conduit 9 into the dust separator 10. The cleansed waste gas is conducted through the conduit 11 to the stack whereas the separated dust is conducted through the conduit 12 into the conveyor device 13. From here it can be fed selectively either to the charging device 14 and thence through the gate valve 14a and conduit 15 into the portion of the reduction zone of the furnace following the last burner or through the charging device 19, gate valve 19a and conduit 20 to the section of the reduction zone situated in front of the last burner.

If a particularly large quantity of dust is removed in the cyclone separator 10 or this dust is very fine grained, it may be advisable to convert the dust into pellets in a pelleting plant 16 before recycling it into the furnace.

It may also be advisable when charging the raw ore to separate the fine grain in a screening plant 17 before feeding the coarse grain to the furnace and to conduct the fine grain through the conduit 18 directly to the conveyor device 13 whence it can be fed into the reduction zone of the furnace selectively either through the charging device 14, gate valve 14a and conduit 15 or the charging device 19, gate valve 19a and conduit 20. The finished reduced ore is then discharged at the outlet end 21 and can be quenched immediately after discharge by dumping it into a water tank 22.

FIG. 2 shows a modification of the invention which differs from the construction shown in FIG. 1 substantially in that the reduction of the ore, preheated in the rotary furnace 2, is carried out in a separate reduction drum 23. This can, if necessary, be additionally heated by burners 7b which, like the burners 7b in FIG. 1, are operated to produce a reducing effect whereas the burners 7a of the rotary furnace 2 are, in this case, run with oxidizing effect.

An intermediate dust separating device 24 is introduced between the reducing drum 23 and the preheating furnace 2. The dust produced here is fed with the dust coming from the conduit 12 to the reducing drum 23 through the conduit 25 and the preheated ore discharged from the preheating furnace 2 through the conduit 26.

In this construction the ore and gas are in countercurrent flow both in the preheating furnace 2 and also in the reducing drum 23.

FIG. 3 illustrates another construction which is a modification of the embodiment shown in FIG. 2, and in which the ore and gas are conducted in concurrent flow in the reducing drum 23. In this case the dust separating device 24a must be arranged following the reduction drum. This method of procedure possesses the advantage that the dust separated in the dust separating device 24a can be immediately added to the production.

In FIG. 4 an embodiment of the invention is shown wherein the outlet end 27 of the rotary furnace 2, in which the dust is recycled through the charging device 14, gate valve 14a and conduit 15 or 19, 19a and 20, is enlarged so as to maintain a low gas flow speed in this portion of the furnace.

It has been found unexpectedly that the heat content of the roasting material in the final zone of the furnace is sufficient to reduce finally and completely the fines and dust which are introduced into this zone as long as the quantity of fines or dust is not too great. The maximum amount of introduced fine material which can be completely reduced in this final cooling zone depends upon the amount of $Fe_3O_4$ in the introduced dust, the particle size of the dust, its temperature at the time of introduction, the composition of the reducing gases, and the temperature at which the reduction roasting is being performed. This maximum quantity can be found by tests for any particular ore. However, ores of ordinary composition undergoing reduction by generating gases at a roasting temperature from 750 to 800° C. have a maximum quantity of approximately 20 to 25% of the charged ore. In exceptionally difficult cases, the quantity can drop to 10% and in very good cases increase to from 35 to 40%. The range of from 20 to 25% serves for the general average of most ores.

Inasmuch as dust is created during the roasting in the furnace and carried away with the exhaust gas, it is not necessary in certain cases to sieve out the fines from the ores before charging the ore to the furnace. The carried away dust is collected in cyclone 10 and recycled into the furnace.

This recycled dust is introduced into the furnace with as little heat loss as possible.

If the raw ore which is to be roasted contains too large an amount of fines or if the ore is so fragile as to break apart easily or tends to disintegrate too much during roasting, it may happen that the effective amount of fines in the furnace is more than the final zone of the furnace can handle for purposes of reducing the fines. In such case, the total quantity of dust carried in the exhaust gases can be recycled and reduced in the final zone of the furnace according to this invention if the recycled fines are introduced into the furnace between the last burner 7b and the discharge end of the furnace.

Again the naturally contained quantity of fines in the ore can be less than the amount of fines which could be roasted by the heat contained in the roasted material in the final zone. In this case, the fines are introduced into the final furnace zone in such amounts that they can utilize the entire available heat of the roasted material in the final zone.

When there is not enough iron ore fines, together with the dust from the furnace, to utilize all of the heat in the final furnace zone or if it is impractical to sieve out the fines from the iron ore supply, a make-up quantity of raw ore can be used, with or without previous sieving, after it is ground into fines. Thus the total available heat in the final zone can be used for reducing ore. The quantity of raw ore added to the recycled dust primarily depends upon its moisture content if it has not been previously dried, as by the exhaust gases from the furnace. In general, the ore charged to the furnace has a water content no greater than from 5 to 6%.

A portion of the material introduced into the final zone is not discharged from the furnace with the reduced material but is carried off with the exhaust gases. However, this does not disturb the process of this invention because only the balance between the amount of recycled material and the available heat in the final zone needs to be made. For example, a rotary furnace charged with ore having an exceptionally great amount of fines had about 18.3% of the material charged into the furnace carried out with the exhaust gases as dust, this exhausted dust being dispersed and lost in the atmosphere. When the dust was recovered in the cyclone 10 and returned to the final zone of the furnace, a balanced condition was reached representing 22.7% of the charged ore. As a comparison, when the dust recovered in cyclone 10 was returned to the furnace at the inlet opening thereof and along with the raw material, the quantity of dust thus returned increased from 22.7 to 45.2% of the amount of ore charged into the furnace.

Consequently, it is seen that the process of this invention not only obtains a better heat economy, but also a great decrease in the amount of dust recycled as compared to the usual method except methods without any recirculation of dust.

Another condition arises when the amount of fines in the ore is so great that a balanced condition in the final zone occurs only when an impractical dust content of the exhaust gases exists. In this case, the quantity of dust is reduced to an allowable amount by pelletizing a portion or the whole of the fines on the pelletizer 16 before re-introduction into the furnace. Preferably only the finest portion of the recycled dust is pelletized. Pellets having diameters from 2 to 3 mm. are sufficient and larger sized pellets are not necessary nor even usable.

As shown in FIGURE 4, the diameter of the furnace is increased from adjacent the point of introducing the fine material through charging ring 20a to the final end of the furnace. By so doing, the velocity of the gas in the final cooling zone is reduced so that the quantity of dust carried away by the gases is accordingly decreased.

As shown in FIGURE 2, the cooling of the roasted material does not take place in the furnace itself but in a separate rotary drum 23 which has a diameter greater than that of the furnace. A cyclone 24 or some other dust separating member is mounted between the drum and furnace in order to decrease the quantity of dust which would be carried away by the cooling gas.

The cooling gas in drum 23, in general, is directed in countercurrent flow to the roasted material passing through the drum in order to obtain a good heat economy. But if the highest heat economy is not as essential as a completely reduced dust, the cooling gas is put in concurrent flow with the material. In the latter case, drum 23 functions in part as a roasting drum for the dust and as a cooling drum for the previously roasted material.

Overly reduced roasted material is avoided by altering the composition of the cold charge reducing gas, as, for example, by adding components to the gas which are reducing or inert to the $Fe_3O_4$ but are oxidizing with regard to the FeO. Such components can be $H_2O$ or $CO_2$. The exhaust gas of the furnace itself can be used as a return component gas, especially when the heating zone of the furnace is operated under netural or slightly reducing conditions. The charging device 20, 20a is provided with a rotary gate valve 19a in order to seal the opening against the escape of gas. This valve is operated by an automatically controlled motor M so that when dust is not being introduced into the furnace no outside air can enter and interfere with the roasting process.

Specific examples of the process of this invention are given as follows. In each case it was intended to roast about 41.7 metric tons per hour, approximately 1,000 metric tons per day, of ore in a Lurgi rotary furnace having an inner diameter of 3.1 m. and a length of 50 m. The ore had the following analysis:

The sieve analysis of the ore was:

| | Percent |
|---|---|
| Over 10 mm. | 5.3 |
| 10–5 mm. | 34.2 |
| 5–3 mm. | 19.4 |
| 3–1 mm. | 15.8 |
| 1–0.5 mm. | 6.2 |
| Below 0.5 mm. | 19.1 |

The chemical analysis of this ore was: Total Fe 45.1%, thereof $Fe^{II}$ 1.3%; the remainder mainly $SiO_2$. The moisture of the ore as charged: 3.5%.

EXAMPLE 1

Old Process

The dust produced during roasting was recycled and charged with the raw ore entering the furnace. A balanced condition was reached when the dust became about 22% of the raw ore being charged, that is the total charge became 41.7 metric tons of raw ore plus 9.2 metric tons of dust equating 50.9 metric tons per hour.

The furnace was heated with mantle burners. Reducing gas was introduced through the discharge end of the furnace. Blast furnace gas having a heat valve of 980 kcal./Nm.³ was used for heating, Nm.³ being a cubic meter at a standard pressure and temperature. The burners consumed 6,400 Nm.³ of blast furnace gas per hour. An additional 3,300 Nm.³ of blast furnace gas was burned in the center of the furnace. The total heat used came to 227 kcal./kilogram of raw ore. The discharge temperature of the roasted ore was from about 480 to 500° C. The roasted ore had an iron concentration of 70.8%. In the waste was 3.1% iron, and 97.8% iron was the output result.

EXAMPLE 2

For this invention the furnace was slightly rearranged for charging a portion of the raw ore fines and recycled dust into the reduction zone of the furnace as described in FIGURE 1. Both the coarse particles and the fines of the raw ore had the same chemical analysis as in Example 1. The coarse particle size was unchanged, while the fines were of a size less than 2.0 mm.

A balanced condition was reached when the dust became about 9.3% of the charged raw ore. As the dust was now introduced into the furnace reduction zone, the amount of raw ore charged into the mouth of the furnace was increased to 1090 metric tons per day, or about 45.42 metric tons per hour. Blast furnace gas consumed by the burners was 6,450 Nm.³ per hour. An additional 3,800 Nm.³ per hour of reduction gas was applied to the center of the furnace. The 9.3% of recycled dust amounted to about 4.2 metric tons per hour. In addition, the fines charged along with the dust were about 8.8% of the charged raw ore and amounted to 4.0 metric tons per hour. Thus 49.42 metric tons per hour of raw ore was reduced by using 6,450 plus 3,800 equaling 10,250 Nm.³ of blast furnace gas. Heat consumption therefore was 204 kcal./kilogram of raw ore. The discharge temperature of the roasted ore was from about 330 to 350° C. In the waste and iron concentrate were the same percentages as in Example 1.

A comparison of Example 1 and 2 shows that for approximately the same furnace output, in metric tons per hour, a savings of 23 kcal./kilogram of raw ore was obtained by the process of this invention as given in Example 2.

A particularly advantageous method of conducting the fine grained ore into the final zone of the furnace consists in introducing the fine grained portion separated from the remainder of the ore in the upper furnace neck into a feed zone which is separated from the feed zone of the remainder of the ore by a baffle ring or a bulge. In this feed zone for the fine grained portion of the ore an aperture is provided in the masonry through which the fine grained ore is guided into the final zone in a spiral passage on the periphery of the furnace. This passage can itself also be formed in the masonry. It is, however advisable to extend the apertures in the feed zone for the fine grained material also through the shell and to arrange the spiral passage around the outer side of the shell of the rotary furnace. In this manner the advantage is derived that the spiral passage, which, as is known, is always strongly stressed during the rotation of the furnace, is arranged outside the masonry. By the rotation of the rotary furnace the fine grained material is positively guided to the final zone and is there charged into the furnace through suitable apertures in the masonry and if necessary also in the shell of the furnace.

This manner of feeding the fine grained material into the final zone is hereinafter explained with the aid of FIGURE 5.

In the rotary furnace 2 a charging device 1, 1a and 29 for feeding the ore to be treated is mounted on the upper furnace neck 28. Separate therefrom the fine grained portion of the ore in the separate charging zone 31 is introduced through the neck 28 by means of a charging device 30. The remainder of the ore is, however introduced through the charging zone 32. The two charging zones 31 and 32 are separated by a baffle ring 33 so that the fine grained ore does not mix with the remainder of the ore. An aperture 34 is provided in the masonry and in the shell of the furnace and a passage 35 leads from this aperture around the rotary furnace in the form of a helix. The fine grained ore is fed into the final zone 37 through the aperture 36 in the wall of the rotary furnace and in the masonry. The cyclone separating device 10 for separating the dust is arranged at a higher level than the charging device 30 so that the ore runs into the charging device by force of gravity.

Having now described the means by which the objects of the invention are obtained, we claim:

1. A process for reducing iron ores comprising charging coarse hematite particles into the inlet end of a rotary furnace, roasting said ore to magnetite in the presence of a reducing gas, discharging the magnetite from the outlet end of the furnace, and introducing fine particles of hematite having a size not greater than 1 mm. into said furnace adjacent said outlet end at a position where the fine particles are brought to a temperature at which they are reduced to magnetite by heat provided by the reduced to magnetite coarse particles while simultaneously the reduced coarse particles are cooled below re-oxidation temperature.

2. A process as in claim 1, said fines comprising at least in part recycled incompletely reduced iron ore dust exhausted from said furnace.

3. A process as in claim 2, said fines comprising from about 10 to 35% of the ore charged into said furnace.

4. A process as in claim 3 in which heating means are located in said furnace adjacent said outlet end, comprising introducing said fines between said heating means and said outlet end.

5. A process as in claim 3 in which heating means are located in said furnace adjacent said outlet end, comprising introducing said fines before said heating means and said outlet end.

6. A process as in claim 1, said outlet end of said furnace further comprising a separate rotary drum, and further introducing iron ore fines having a particle size not greater than 3.0 mm. into said drum.

7. A process as in claim 6, further comprising passing reducing gas through said drum in countercurrent flow with respect to the flow of iron ore through said drum.

8. A process as in claim 6, further comprising passing reducing gas through said drum in concurrent flow with respect to the flow of iron ore through said drum.

9. A process as in claim 8, said fines being at least in part pelletized.

10. A process as in claim 9, only the finer portions of said fines being pelletized.

11. A process as in claim 10, said pelletized fines having diameters ranging from about 2 to 3 mm.

12. A process as in claim 11, further comprising introducing preground raw iron ore together with said fines.

References Cited in the file of this patent

UNITED STATES PATENTS

| | | |
|---|---|---|
| 1,811,920 | Dickson | June 30, 1931 |
| 1,905,604 | Queneau | Apr. 25, 1933 |
| 2,039,062 | Debuch | Apr. 28, 1936 |
| 2,039,645 | Hechenbleikner | May 5, 1936 |
| 2,433,781 | McFeaters | Dec. 30, 1947 |
| 2,477,454 | Heath | July 26, 1949 |
| 2,522,639 | Royster | Sept. 19, 1950 |
| 2,528,553 | Royster | Nov. 7, 1950 |
| 2,650,159 | Tarr et al. | Aug. 25, 1953 |
| 2,692,050 | Nelson | Oct. 19, 1954 |
| 2,696,432 | Davis | Dec. 7, 1954 |